United States Patent
Roesner

(10) Patent No.: US 7,119,664 B2
(45) Date of Patent: Oct. 10, 2006

(54) DEEP SLEEP IN AN RFID TAG

(75) Inventor: Bruce B. Roesner, San Diego, CA (US)

(73) Assignee: ID Solutions, Inc., Taipei (TW)

(*) Notice: Subject to any disclaimer, the term of this patent is extended or adjusted under 35 U.S.C. 154(b) by 118 days.

(21) Appl. No.: 10/666,226

(22) Filed: Sep. 17, 2003

(65) Prior Publication Data

US 2005/0057341 A1    Mar. 17, 2005

(51) Int. Cl.
*H04Q 5/22* (2006.01)
*G08B 13/14* (2006.01)

(52) U.S. Cl. ............ 340/10.33; 340/10.2; 340/10.3; 340/10.4; 340/10.1; 340/572.3

(58) Field of Classification Search ........... 340/10.33, 340/10.2, 10.3, 10.4, 10.1, 572.3
See application file for complete search history.

(56) References Cited

U.S. PATENT DOCUMENTS

| | | | |
|---|---|---|---|
| 5,537,105 A | 7/1996 | Marsh et al. | |
| 5,583,850 A * | 12/1996 | Snodgrass et al. | 370/342 |
| 5,874,724 A | 2/1999 | Cato | |
| 5,942,978 A * | 8/1999 | Shafer | 340/572.9 |
| 5,963,144 A | 10/1999 | Kruest | |
| 5,990,794 A * | 11/1999 | Alicot et al. | 340/573.1 |
| 6,061,344 A | 5/2000 | Wood, Jr. | |
| 6,072,383 A * | 6/2000 | Gallagher et al. | 340/10.2 |
| 6,072,801 A | 6/2000 | Wood, Jr. et al. | |
| 6,104,333 A * | 8/2000 | Wood, Jr. | 341/173 |
| 6,118,789 A | 9/2000 | Wood, Jr. | |
| 6,147,655 A | 11/2000 | Roesner | |
| 6,229,443 B1 | 5/2001 | Roesner | |
| 6,265,976 B1 | 7/2001 | Roesner | |
| 6,275,476 B1 | 8/2001 | Wood, Jr. | |
| 6,661,336 B1 * | 12/2003 | Atkins et al. | 340/10.2 |
| 6,690,264 B1 * | 2/2004 | Dalglish | 340/10.4 |
| 2002/0097143 A1 | 7/2002 | Dalglish | |

* cited by examiner

*Primary Examiner*—Jeffery Hofsass
*Assistant Examiner*—Scott Au
(74) *Attorney, Agent, or Firm*—Fish & Richardson P.C.

(57) ABSTRACT

Systems and techniques to provide radio frequency identification tags including a non-responsive state, which is independent of supplied power, initiated in conjunction with a tag communications reset. In general, in one implementation, a passive radio frequency identification tag includes an antenna, a radio frequency interface coupled with the antenna, and control logic that initiates a deep sleep state in response an event, the deep sleep state including a non-responsive state that is independent of supplied power, and the control logic providing a following state entered upon conclusion of the non-responsive state, where communications initiate from the following state.

30 Claims, 4 Drawing Sheets

DEEP SLEEP IN AN RFID TAG

BACKGROUND

The present application describes systems and techniques relating to radio frequency identification (RFID) tag design and use, for example, an RFID chip design for use in tag communication and management.

Traditional passive RFID tags frequently include some form of deactivation capability. Such capability can be of use when reading a large number of passive RFID tags in a field. After a particular tag has been read, that tag can be deactivated to prevent the tag from being read again, while the tag remains supplied with power.

Traditional tag deactivation capabilities provide a non-responsive state for the chip in the tag. The non-responsive state can be dependent on supplied power, such as from a reader or a charge storage device built into the tag (e.g., a large capacitor attached in parallel with the chip's voltage rail so that the chip does not lose power when temporarily removed from the RF field). The non-responsive state can be independent of supplied power, such as a state that blocks the input or the output of the chip using an internal clock that doesn't require maintaining normal power levels in the chip (e.g., a series switch activated in response to a "Cloak" logic command).

When the input is blocked using the Cloak technique, the front end of the chip is effectively disconnected such that incoming signals cannot be recognized in the chip, and the chip cannot respond to any commands from a reader. As described in U.S. Pat. No. 5,963,144, a series switch can be activated to disconnect an antenna of a passive RFID tag for a period determined by a charged resistor-capacitor (RC) circuit. When the output is blocked using the "Mute" technique, the chip continues listening and responding to commands from a reader, but cannot communicate the responses due to the blocked output. As described in U.S. Patent Application Publication No. 2002/0097143 A1, an AND gate can be used to couple a Cloak bar node and an Output node such that no signal can be backscattered from the passive RFID tag when the tag is Muted.

SUMMARY

The present disclosure includes systems and techniques relating to radio frequency identification tags including a non-responsive state, which is independent of supplied power, initiated in conjunction with a tag communications reset. According to an aspect, a passive radio frequency identification tag includes an antenna, a radio frequency interface coupled with the antenna, and control logic that initiates a deep sleep state in response an event, the deep sleep state including a non-responsive state that is independent of supplied power, and the control logic providing a following state entered upon conclusion of the non-responsive state, where communications initiate from the following state.

Using the systems and techniques described, passive RFID tags can be placed in a deactivated state of deep sleep, where the tag remains in deep sleep even if it falls out of, and then re-enters the RF field supplying the tag with power. The deep sleep state prevents the tag from timing out of its deactivated state and unexpectedly jumping into the middle of current tag-reader communications. This provides significant flexibility and control in designing RFID chip communication and management protocols.

Moreover, the tag may allow the deep sleep state to be concluded by a command received from a reader, providing additional flexibility. In reader systems designed to read many tags quickly, the deep sleep state may prevent a tag from being read multiple times unnecessarily. Reducing repetitive reading of tags may significantly increase a reader system's efficiency. Moreover, the present systems and techniques may result in reduced tag manufacturing costs.

Details of one or more implementations are set forth in the accompanying drawings and the description below. Other features and advantages may be apparent from the description and drawings, and from the claims.

DRAWING DESCRIPTIONS

Details of one or more embodiments are set forth in the accompanying drawings and the description below. Other features and advantages may be apparent from the description and drawings, and from the claims.

DETAILED DESCRIPTION

Figure 1:
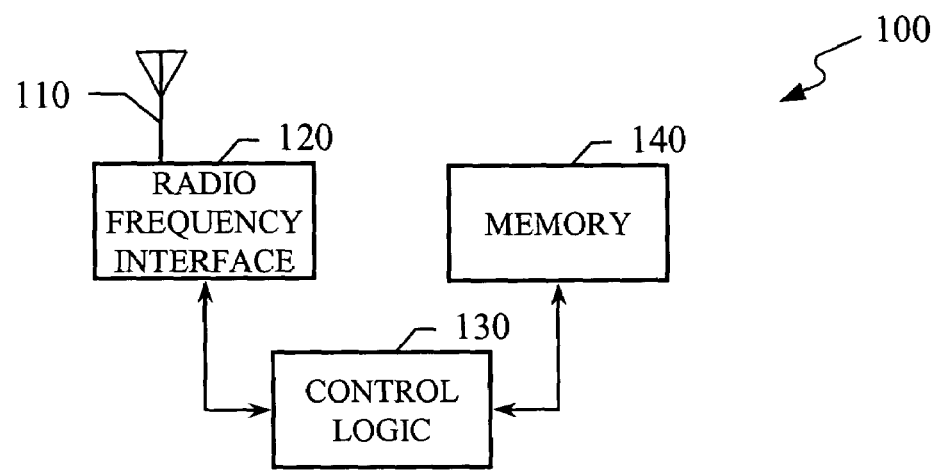
FIG. 1 illustrates, in block diagram form, a passive RFID tag that employs a deep sleep state.

FIG. 1 illustrates, in block diagram form, a passive RFID tag 100 that employs a deep sleep state. The tag 100 can include an antenna 110, a radio frequency (RF) interface 120, and control logic 130. The tag 100 can also include a memory 140.

The tag 100 can obtain its power from an inductive coupling of the tag to energy circulating around a reader coil when designed to operate in a low frequency (LF) band (e.g., 13.56 MHz). Alternatively, the tag 100 can use radiative coupling, such as in ultra-high frequency (UHF) and microwave RFID systems.

The RF interface 120, the control logic 130 and the memory 140 can be combined in a single integrated circuit (IC), such as a low-power complementary metal oxide semiconductor (CMOS) IC. The RF interface 120 can be an analog portion of the IC, and the control logic 130 and the memory 140 can be a digital portion of the IC. The memory 140 can be a non-volatile read-write memory, such as an electrically erasable programmable read only memory (EEPROM).

The IC can also include an antenna tuning capacitor and an RF-to-DC rectifier system designed for the antenna 110, which is the coupling element for the tag 100. The antenna 110 can enable the passive RFID tag to obtain power to energize and active the tag's chip. The antenna 110 can have many different shapes and sizes, depending on the type of RFID coupling system being employed.

The control logic 130 can include both digital control and data modulation circuits. The control logic 130 can initiate a deep sleep state in response to an event, such as a received deep sleep command or a last command in a sequence of associated commands. The deep sleep state can include a non-responsive state that is independent of supplied power. The non-responsive state can be implemented using the control logic 130 and/or the RF interface 120.

The control logic 130 provides a following state entered upon conclusion of the non-responsive state, where communications initiate from the following state. The following state can be an initial communication state, an isolate state, or the non-responsive state reinitiated, as described further below. Moreover, the non-responsive state can be implemented such that the non-responsive state can be concluded by cessation of an internal timer (e.g., the natural voltage decay of a charged RC circuit within the IC) or by receipt of a command, such as a full wake command received from a reader.

The control logic 130 can thus ensure that, once the tag is placed in deep sleep, the tag does not wake up in the middle of a sequence of commands and jump into communications currently occurring between other tags and a reader. The control logic 130 can require the tag 100 to go to the beginning of a command structure as part of entering the deep sleep state. Thus, while the tag 100 can continue to listen for a wake command, the tag 100 can ignore other commands that are not intended for the tag in deep sleep.

When the tag 100 is instructed to sleep, the tag can be placed in a deep sleep mode and held in that state until one of two conditions is met: (1) a specific command is received to awaken the tag, or (2) the internal timer runs out. When the tag 100 awakens from the deep sleep state, the tag can then respond to additional commands from a reader. Thus, the tag 100 can be deactivated using a non-responsive state that is independent of supplied power; this non-responsive state can be maintained even if the tag falls out of the RF field for a period of time, without requiring the tag 100 to maintain a capacitative power source in the tag.

While the tag 100 is in this non-responsive state, the control logic 130 can still recognize a command to activate the tag 100 and wake up from the deep sleep state. When the tag 100 wakes up, either due to a received command or due to internal cessation, the tag can be prevented from jumping into the middle of current tag-reader communications. By preventing the tag 100 from becoming active in the middle of communications between the reader and other tags, the deep sleep state can be used in passive RFID communication and management protocol(s) to reduce interference among tags being read and increase the efficiency of a tag reader system.

Figure 2:
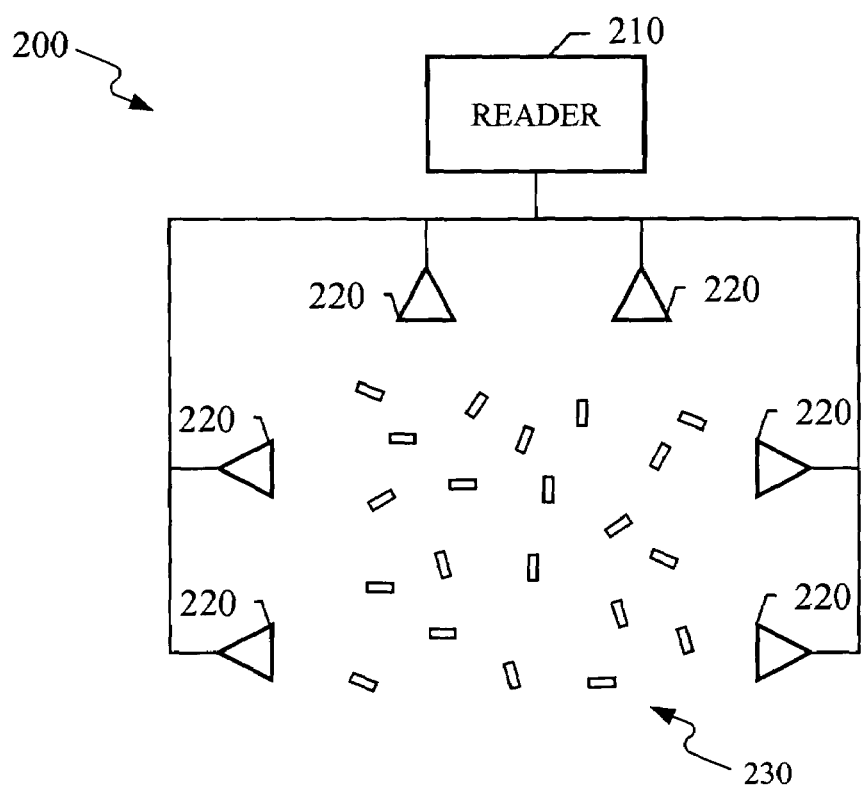
FIG. 2 illustrates, in block diagram form, a HF tag reader system and multiple HF passive RFID tags employing a deep sleep capability.

FIG. 2 illustrates, in block diagram form, a HF tag reader system 200 and multiple HF passive RFID tags 230 employing a deep sleep capability. The reader system 200 can include a reader 210 and multiple reader antennas 220. The reader 210 can include an RF transceiver module, signal processor, and controller unit. Additionally, the system 200 can include a host system (not shown) to which the reader 210 can be communicatively coupled to relay data relating to the tags 230.

The reader antennas 220 can produce partially overlapping fields and can be multiplexed by the reader 210 to read all the HF passive RFID tags 230. In general, the reader system 200 can be designed to provide at least one reader antenna at about forty five to ninety degrees to each tag in a group of randomly oriented tags. Once a tag is read by the system 200, such as by using a binary search protocol to identify the tag, that tag can be turned off temporarily by placing the tag in the deep sleep state. The deep sleep state can reset the chip in the tag with the exception of the command structure looking for a full wake command.

Thus, a passive RFID tag placed in the deep sleep state can remain in its inactive state even if the tag temporarily falls out of a field providing the tag's power, the tag can be brought out of the deep sleep state by issuing an appropriate wake command, and the tag can ignore all other commands while it remains in the deep sleep state. This deep sleep state provides significant flexibility in how the reader 210 communicates and manages the tags 230.

When a tag is placed in the deep sleep state, the reader 210 can proceed with communicating with the remaining tags without the risk that the tag in deep sleep will wake up in the middle of a sequence of commands and unexpectedly jump into the middle of current tag-reader communications. The tags 230 can be designed such that they communicate with the reader 210 only if they come in at the beginning of a command structure. Moreover, multiple sleep states can be employed, such as described below, to provide still further flexibility in tag communication and control.

Figure 3:
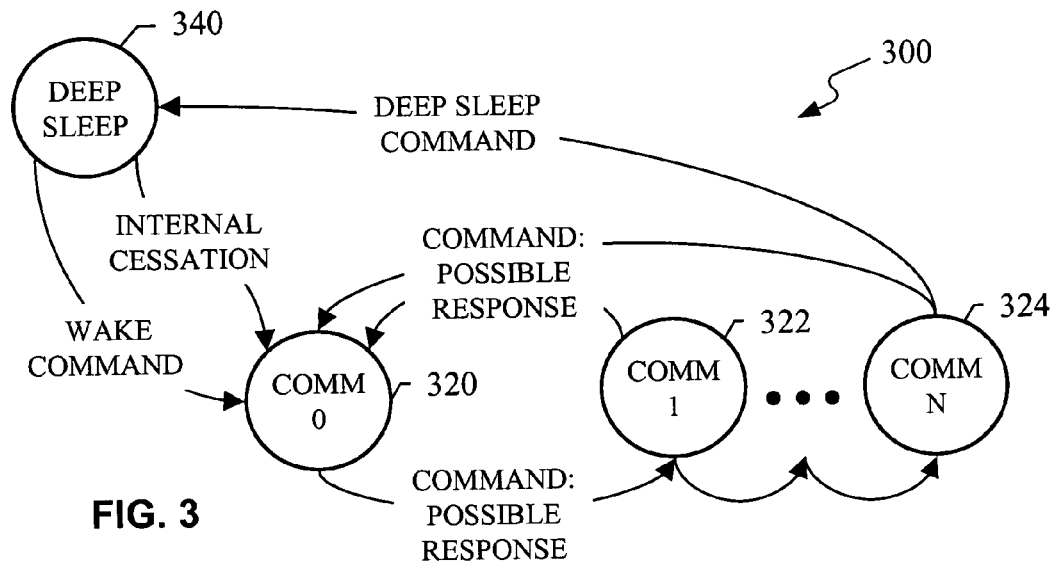
FIG. 3 is a state diagram illustrating modes of operation, including a deep sleep mode, as can be implemented in control logic of a passive RFID tag.

FIG. 3 is a state diagram 300 illustrating modes of operation, including a deep sleep mode, as can be implemented in control logic of a passive RFID tag. Multiple communication states 320, 322, 324 can allow response to a sequence of associated commands when receipt of the command sequence begins in an initial communication state 320. A command received in a communication state can result in a transition to a new communication state and/or in a possible response being generated. For example, the command sequence can be a portion of a binary search protocol, where tags in a field are iteratively queried as to whether they have an internal identifier with particular values in specific bit locations, and the tags respond accordingly.

A deep sleep state 340 can be initiated from any of these communication states in response to receipt of a deep sleep command and/or automatically, such as at the end of a command sequence. The deep sleep state 340 can be a non-responsive state that is independent of supplied power, and the control logic can provide a following state entered upon conclusion of the non-responsive state, where this following state is the initial communication state 320. The non-responsive state, and thus the deep sleep state 340, can be concluded in response to receipt of a wake command or internal cessation of the non-responsive state. The wake command can be specific to an identified tag or can be a universal wake command applicable to multiple tags.

When the deep sleep state 340 concludes, and the initial communication state 320 is entered, any received commands that are not a beginning command in a command sequence, and thus relate to tags that are currently in a higher communication state 322–324, can be ignored by the tag. Because the tag has just left the deep sleep state 340, the tag can remain in the initial communication state 320 until it receives the beginning command in a full command sequence.

Figure 4:
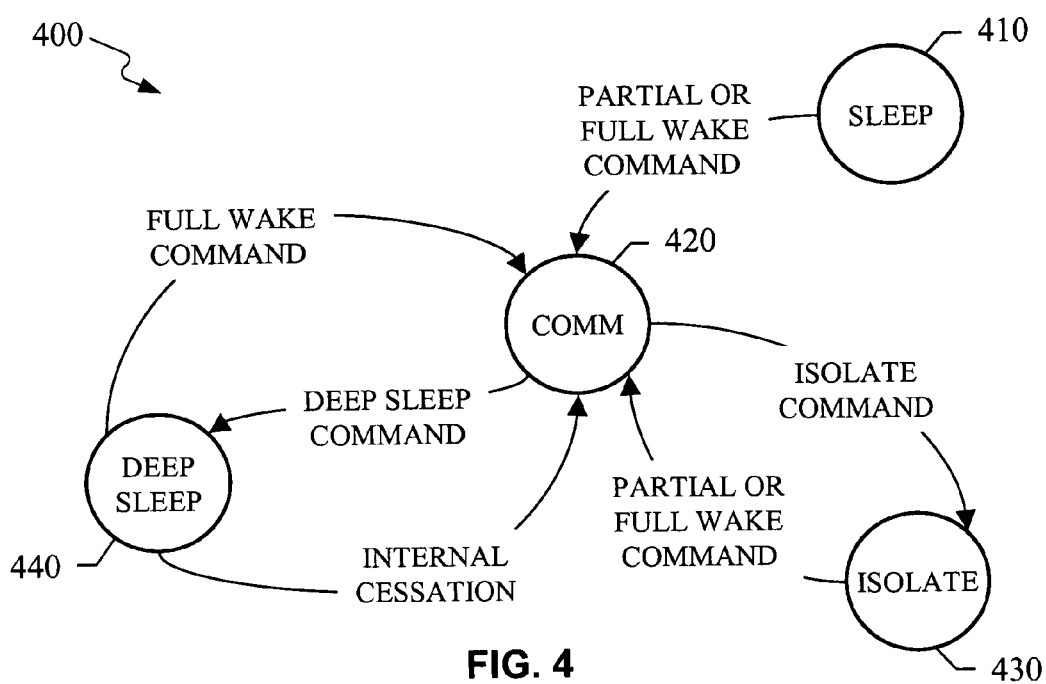
FIG. 4 is a state diagram illustrating additional modes of operation, including a deep sleep mode, as can be implemented in control logic of a passive RFID tag.

FIG. 4 is a state diagram 400 illustrating additional modes of operation, including a deep sleep mode, as can be implemented in control logic of a passive RFID tag. A sleep state 410 can be entered by the tag when it is first powered up by a RF field. This sleep state 410 causes the tag to wait for a recognized command from a reader before entering a communication state 420. Such recognized commands can be a partial wake command, a full wake command, and/or a beginning command in a full command sequence. Thus, the communication state 420 can have multiple separate communications states as described above in connection with FIG. 3, and/or the sleep state 410 can be considered the initial communication state described above.

A tag can enter an isolate state 430, where the tag is isolated in the field, in response to an isolate command received from a reader and/or automatically, such as at the end of a command sequence. The tag can be removed from the isolate state 430 and put back in the communication state 420 in response to a partial wake command, a full wake command, and/or a beginning command in a full command sequence. The sleep and isolate states 410, 430 can be dependent upon supplied power, and the sleep and isolate states 410, 430 can correspond to the same state in the control logic, or they can correspond to distinct control logic states, depending on the implementation.

A deep sleep state 440 can be implemented as described above, with the addition that the deep sleep state 440 can be concluded by receipt of a full wake command. The full wake command can be distinguished from the partial wake command by the tag, and the full wake command can be specific to an identified tag or can be a universal full wake command applicable to multiple tags. Thus, for example, the partial wake command can cause all tags in a field that are in either the sleep or isolate states 410, 430 to become active again, and the full wake command can cause all tags in the field that are in either the sleep, isolate or deep sleep states 410, 430, 440 to become active again.

Other alternative functional combinations of the partial and full wake commands are also possible. The partial wake command can cause all tags in a field that are in the sleep state 410 to become active again, and the full wake command can cause all tags in the field that are in either the sleep, isolate or deep sleep states 410, 430, 440 to become active again. The partial wake command can cause all tags in a field that are in the sleep state 410 to become active again, and the full wake command can cause all tags in the field that are in either the sleep or deep sleep states 410, 440 to become active again. The partial wake command can cause all tags in a field that are in either the sleep or isolate states 410, 430 to become active again, and the full wake command can cause all tags in the field that are in either the sleep or deep sleep states 410, 440 to become active again. In implementations where the isolate state is not affected by the full wake command and/or the partial wake command, another command can be used to conclude the isolate state, or no such command may be provided (e.g., when the isolate state only concludes upon the tag falling out of the field).

Figure 5:
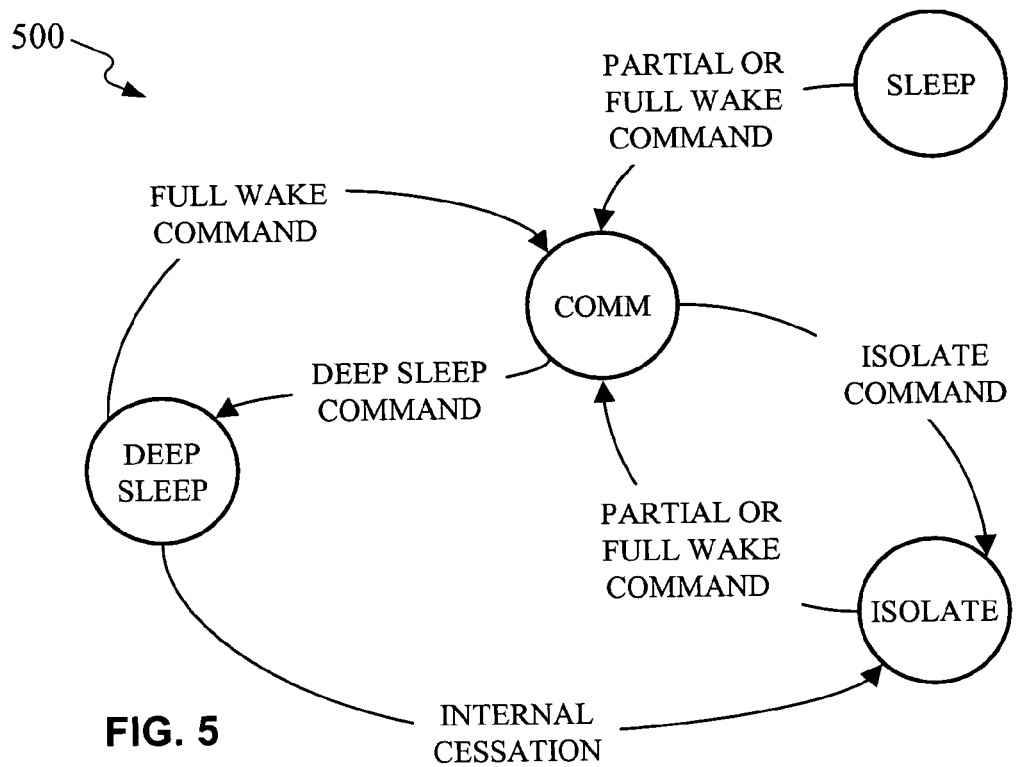
FIG. 5 is a state diagram illustrating a variation of the modes of operation illustrated in FIG. 4.
Figure 6:
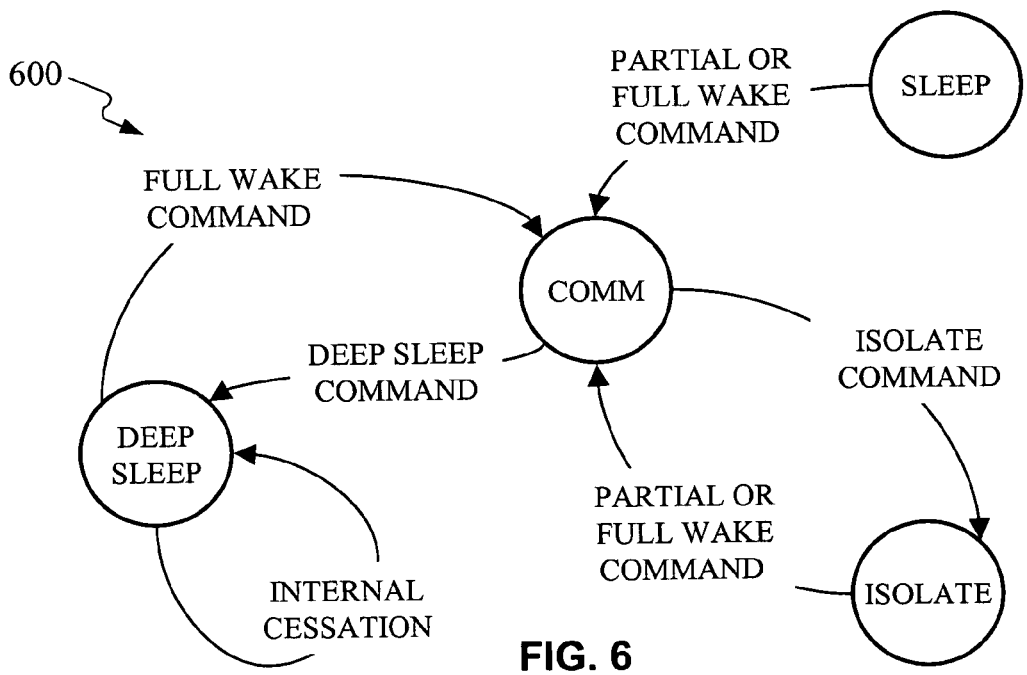
FIG. 6 is a state diagram illustrating another variation of the modes of operation illustrated in FIG. 4.

FIG. 5 is a state diagram 500 illustrating a variation of the modes of operation illustrated in FIG. 4. In this variation, the following state can be the isolate state, and thus internal cessation of the non-responsive state can cause a transition from the deep sleep state to the isolate state. FIG. 6 is a state diagram illustrating another variation of the modes of operation illustrated in FIG. 4. In this variation, the following state can be the non-responsive state reinitiated, and thus internal cessation of the non-responsive state can cause a transition from the deep sleep state back to itself. Other variations of the modes of operation described herein are also possible.

Figure 7:
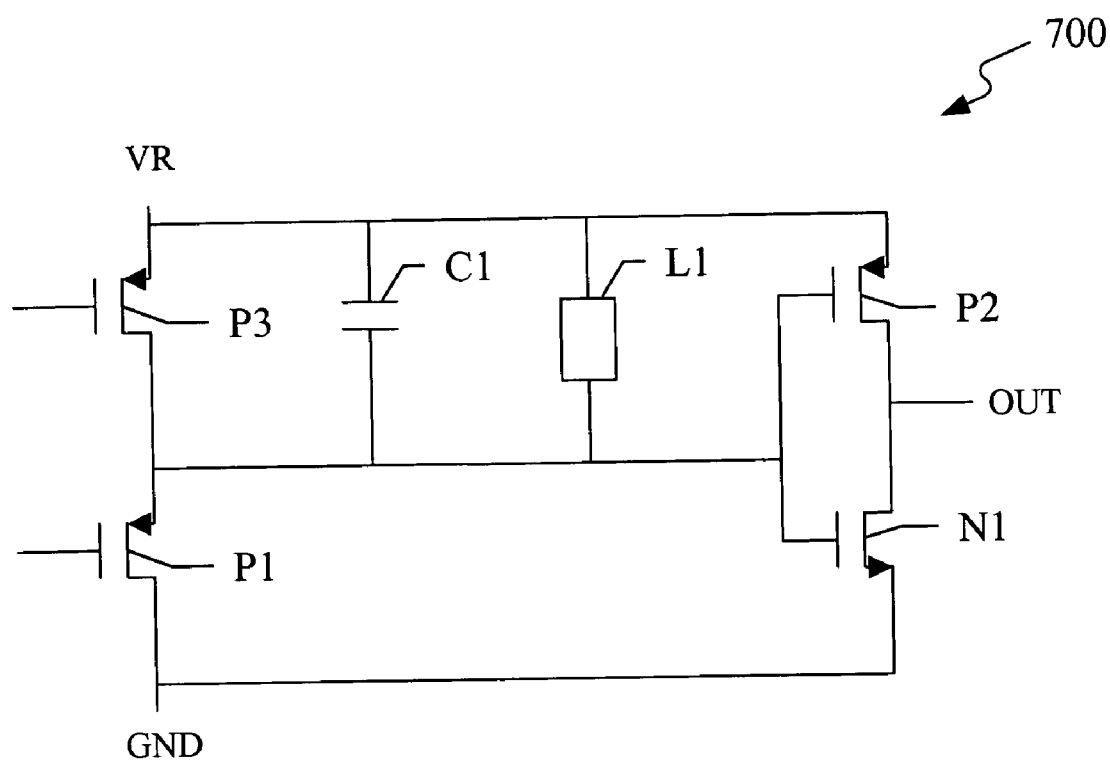
FIG. 7 is a circuit diagram illustrating an example circuit that can be used in implementing a deep sleep mode in a passive RFID tag.

FIG. 7 is a circuit diagram illustrating an example circuit 700 that can be used in implementing a deep sleep mode in a passive RFID tag. The circuit 700 includes a voltage rail (VR) line, a ground (GND) line, an output (OUT) line, a capacitor C1, a load device L1, and four transistors N1, P1, P2, P3. During normal operation of the tag, the transistors P1, P3 are off and the common node between the transistors is pulled high so that the output is low. To activate deep sleep, P1 can be turned on causing the common node to be pulled low and the output to go high. Over time, the capacitor C1 discharges through the load device L1 and eventually, the output goes low again. To terminate deep sleep, P3 can be turned on, resetting the circuit 700 to its initial state.

The load device L1 can reduce the risk of premature triggering of the circuit 700, such as may happen if the leakage of P1 is greater than the leakage of P3. In addition, C1 and L1 can be selected such that, once deep sleep has been activated, the chances of the circuit 700 not coming back out of the deep sleep state are reduced while power is being supplied.

P1 is attached to GND, in contrast with traditional CMOS logic in which the P channel device is typically attached to the positive voltage rail and the N channel device to ground. Once deep sleep is activated, a voltage is built up across the capacitor C1. If power to the chip is subsequently lost and VR drops to 0 volts, the bottom node of the capacitor should go below ground. The drain of an N channel device may then become a forward biased diode causing the capacitor C1 to discharge. Thus, when power is reapplied, the circuit may not be in the deep sleep state. Connecting the P1 transistor to ground as shown in the circuit 700 can prevent this from happening.

Other embodiments may be within the scope of the following claims.

What is claimed is:

1. A passive radio frequency identification tag comprising:
   an antenna;
   a radio frequency interface coupled with the antenna; and
   control logic that initiates a deep sleep state in response to an event, the deep sleep state comprising non-responsive state that is independent of supplied power, and the control logic providing a following slate entered upon conclusion of the non-responsive state, wherein communications initiate from the following state, wherein the following state comprises an initial communication state from a plurality of communication states, wherein the plurality of communication states allow response to a sequence of associated commands when receipt of the command sequence begins in the initial communication state; wherein the deep sleep state initiates in response to an event comprising receipt of a deep sleep command; wherein the non-responsive state concludes in response to a first occurring event from events comprising receipt of a wake command and internal cessation of the non-responsive state; and where the control logic further provides a sleep state that is entered upon power up and an isolate state that is entered upon receipt of an isolate command, the sleep and isolate states being dependent upon supplied power, wherein the sleep, isolate and non-responsive states conclude upon receipt of a full wake command, and the sleep and isolate states, but not the non-responsive state, conclude upon receipt of a partial wake command.

2. The passive radio frequency identification tag of claim 1, where the radio frequency interface comprises an analog portion of a complementary metal oxide semiconductor (CMOS) integrated circuit (IC), the control logic comprises a digital portion of the CMOS IC, and the internal cessation of the non-responsive state comprises a voltage decay of a charged RC circuit in the CMOS IC.

3. A passive radio frequency identification tag comprising:
   an antenna;

a radio frequency interface coupled with the antenna; and
control logic that initiates a deep sleep state in response to an event, the deep sleep state comprising a non-responsive state that is independent of supplied power, and the control logic providing a following state entered upon conclusion of the non-responsive state, wherein communications initiate from the following state, wherein the following state comprises an initial communication state from a plurality of communication states, wherein the plurality of communication states allow response to a sequence of associated commands when receipt of the command sequence begins in the initial communication state; wherein the deep sleep state initiates in response to an event comprising receipt of a deep sleep command; wherein the non-responsive state concludes in response to a first occurring event from events comprising receipt of a wake command and internal cessation of the non-responsive state; and where the control logic further provides a sleep state that is entered upon power up and an isolate state that is entered upon receipt of an isolate command, the sleep and isolate states being dependent upon supplied power, wherein the sleep and non-responsive states, but not the isolate state, conclude upon receipt of a full wake command, and the sleep and isolate states, but not the non-responsive state, conclude upon receipt of a partial wake command.

4. The passive radio frequency identification tag of claim 3, where the radio frequency interface comprises an analog portion of a complementary metal oxide semiconductor (CMOS) integrated circuit (IC), the control logic comprises a digital portion of the CMOS IC, and the internal cessation of the non responsive state comprises a voltage decay of a charged RC circuit in the CMOS IC.

5. A passive radio frequency identification tag comprising:
an antenna;
a radio frequency interface coupled with the antenna; and
control logic that initiates a deep sleep state in response to an event, the deep sleep state comprising a non-responsive state that is independent of supplied power, and the control logic providing a following state entered upon conclusion of the non-responsive state, wherein communications initiate from the state, wherein the following state comprises an initial communication state from a plurality of communication states, wherein the plurality of communication states allow response to a sequence of associated commands when receipt of the command sequence begins in the initial communication slate; wherein the deep sleep state initiates in response to an event comprising receipt of a deep sleep command; wherein the non-responsive state concludes in response to a first occurring event from events comprising receipt of a wake command and internal cessation of the non-responsive state; and where the control logic further provides a sleep state that is entered upon power up and an isolate state that is entered upon receipt of an isolate command, the sleep and isolate states being dependent upon supplied power; wherein the sleep and non-responsive states, but not the isolate state, conclude upon receipt of a full wake command, and the sleep state, but not the isolate and non-responsive states, conclude upon receipt of a partial wake command.

6. The passive radio frequency identification tag of claim 5, where the radio frequency interface comprises an analog portion of a complementary metal oxide semiconductor (CMOS) integrated circuit (IC), the control logic comprises a digital portion of the CMOS IC, and the internal cessation of the non responsive state comprises a voltage decay of a charged RC circuit in the CMOS IC.

7. A passive radio frequency identification tag comprising:
an antenna;
a radio frequency interface coupled with the antenna; and
control logic that initiates a deep sleep state in response to an event, the deep sleep state comprising a non-responsive state that is independent of supplied power, and the control logic providing a following state entered upon conclusion of the non-responsive state, wherein communications initiate from the following state, wherein the following state comprises an initial communication state from a plurality of communication states, wherein the plurality of communication states allow response to a sequence of associated commands when receipt of the command sequence begins in the initial communication state; wherein the deep sleep state initiates in response to an event comprising receipt of a deep sleep command; wherein the non-responsive state concludes in response to a first occurring event from events comprising receipt of a wake command and internal cessation of the non-responsive state; and where the control logic further provides a sleep state that is entered upon power up and an isolate state that is entered upon receipt of an isolate command, the sleep and isolate states being dependent upon supplied power, wherein the sleep, isolate and non-responsive states conclude upon receipt of a full wake command, and the sleep state, but not the isolate and non-responsive states, conclude upon receipt of a partial wake command.

8. The passive radio frequency identification tag of claim 7, where the radio frequency interface comprises an analog portion of a complementary metal oxide semiconductor (CMOS) integrated circuit (IC), the control logic comprises a digital portion of the CMOS IC, and the internal cessation of the non responsive state comprises a voltage decay of a charged RC circuit in the CMOS IC.

9. A passive radio frequency identification tag comprising:
a radio frequency interface coupled with the antenna; and
control logic that initiates a deep sleep state in response to an event, the deep sleep state comprising a non-responsive state that is independent of supplied power, and the control logic providing a following state entered upon conclusion of the non-responsive state, wherein communications initiate from the following state, wherein the non-responsive state concludes upon internal cessation, the following state comprises an isolate state, and the deep sleep and isolate states conclude upon receipt of a full wake command.

10. The passive radio frequency identification tag of claim 9, where the radio frequency interface comprises an analog portion of a complementary metal oxide semiconductor (CMOS) integrated circuit (IC), the control logic comprises a digital portion of the CMOS IC, and the internal cessation of the non responsive state comprises a voltage decay of a charged RC circuit in the CMOS IC.

11. A passive radio frequency identification tag comprising:
an antenna;
a radio frequency interface coupled with the antenna; and
control logic that initiates a deep sleep state in response to an event, the deep sleep state comprising a non-responsive state that is independent of supplied power, and the control logic providing a following state entered upon conclusion of the non-responsive state, wherein communications initiate the following state, wherein the non-responsive state concludes upon internal cessation, the following state comprises the non-responsive state reinitiated, and the deep sleep state concludes upon receipt of a full wake command.

12. The passive radio frequency identification tag or claim 11, wherein the command sequence comprises at least a portion of a binary search protocol.

13. The passive radio frequency identification tag of claim 11, wherein the antenna comprises a near-field coupling element configured to operate in a high frequency band.

14. The passive radio frequency identification tag of claim 11, further comprising a non-volatile memory.

15. The passive radio frequency identification tag of claim 11, where the radio frequency interface comprises an analog portion of a complementary metal oxide semiconductor (CMOS) integrated circuit (IC), the control logic comprises a digital portion of the CMOS IC, and the internal cessation of the non responsive state comprises a voltage decay of a charged RC circuit in the CMOS IC.

16. A system comprising:
a radio frequency identification (RFID) tag reader that sends commands including at least one sequence of associated commands used to identify an RFID tag on an article; and
multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
wherein the control logic further provides a sleep state that is entered upon power up and an isolate state that is entered upon receipt of an isolate command, the sleep and isolate states being dependent upon supplied power, wherein the sleep, isolate and non-responsive states conclude upon receipt of a full wake command, and the sleep and isolate states, but not the non-responsive state, conclude upon receipt of a partial wake command.

17. The system of claim 16, wherein the non-responsive state also concludes upon internal cessation.

18. The system of claim 17, wherein each tag comprises an antenna and an integrated circuit (IC) that comprise the radio frequency sub-system and the control logic, and the internal cessation of the non-responsive state comprises a voltage decay of a charged RC circuit in the IC.

19. The system of claim 18, wherein the antenna comprises a near-field coupling element configured to operate in a high frequency band, and the IC further comprises a non-volatile memory.

20. A system comprising:
a radio frequency identification (RFID) tag reader that sends commands including at least one sequence of associated commands used to identify an RFID tag on an article; and
multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
wherein the control logic further provides a sleep state that is entered upon power up and an isolate state that is entered upon receipt of an isolate command, the sleep and isolate states being dependent upon supplied power, wherein the sleep and non-responsive states, but not the isolate state, conclude upon receipt of a full wake command, and the sleep and isolate states, but not the non-responsive state, conclude upon receipt of a partial wake command.

21. The system of claim 20, wherein the non-responsive state also concludes upon internal cessation.

22. A system comprising:
a radio frequency identification (RFID) tag reader that sends commands including at least one sequence of associated commands used to identify an RFID tag on an article; and
multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
wherein the control logic further provides a sleep state that is entered upon power up and an isolate state that is entered upon receipt of an isolate command, the sleep and isolate states being dependent upon supplied power, wherein the sleep and non-responsive states, but not the isolate state, conclude upon receipt of a full wake command, and the sleep state, but not the isolate and non-responsive states, conclude upon receipt of a partial wake command.

23. The system of claim 22, wherein the non responsive state also concludes upon internal cessation.

24. A system comprising:
a radio frequency identification RFID tag reader that sends commands including at least one sequence of associated commands used to identify an RFID tag on an article; and
multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
wherein the control logic further provides a sleep state that is entered upon power up and an isolate state that is entered upon receipt of an isolate command, the sleep and isolate states being dependent upon supplied power, wherein the sleep, isolate and non-responsive states conclude upon receipt of a full wake command, and the sleep state, but not the isolate and non-responsive states, conclude upon receipt of a partial wake command.

25. The system of claim 24, wherein the non responsive state also concludes upon internal cessation.

26. A passive radio frequency identification tag comprising:
    means for receiving power and commands in a command structure; and
    means for entering a deep sleep state comprising a reset of the command structure and a non-responsive state that is independent of supplied power, wherein the non responsive state concludes in response to receipt of a wake command;
    wherein the means for entering the deep sleep state comprise:
    means for preventing premature triggering of the deep sleep state; and
    means for maintaining the deep sleep state when power is reapplied after loss of the received power.

27. A system comprising:
    a radio frequency identification (RFID) tag reader that sends commands including at least one sequence of associated commands used to identify an RFID tag on an article; and
    multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
    wherein the non-responsive state concludes upon internal cessation, the control logic provides an isolate state entered upon conclusion of the non-responsive state, and the isolate state concludes upon receipt of the wake command.

28. The system of claim 27, wherein each tag comprises an antenna and an integrated circuit (IC) that comprise the radio frequency sub-system and the control logic, and the internal cessation of the non-responsive state comprises a voltage decay of a charged RC circuit in the IC.

29. A system comprising:
    a radio frequency identification (RFID) tag reader that sends commands including at least one sequence of associated commands used to identify an RFID tag on an article; and
    multiple passive RFID tags, each tag being attached to an article and each tag comprising a radio frequency sub-system and control logic coupled with the radio frequency sub-system, wherein the control logic resets tag communications and initiates a non-responsive state in response to at least one event, the non-responsive state being independent of supplied power, and the control logic responds to a wake command but ignores other commands in the command sequence while the tag is in the non-responsive state, and the wake command response concludes the non-responsive state;
    wherein the non-responsive state concludes upon internal cessation, and the non-responsive state is reinitiated upon conclusion of the non-responsive state by internal cessation.

30. The system of claim 29, wherein each tag comprises an antenna and an integrated circuit (IC) that comprise the radio frequency sub-system and the control logic, and the internal cessation of the non-responsive state comprises a voltage decay of a charged RC circuit in the IC.

* * * * *